Sept. 3, 1929. R. A. FERGUSON 1,726,660
IMPLEMENT HITCH
Filed June 29, 1925 4 Sheets-Sheet 1

Inventor
ROY A. FERGUSON
By Paul, Paul & Moore
Attorneys

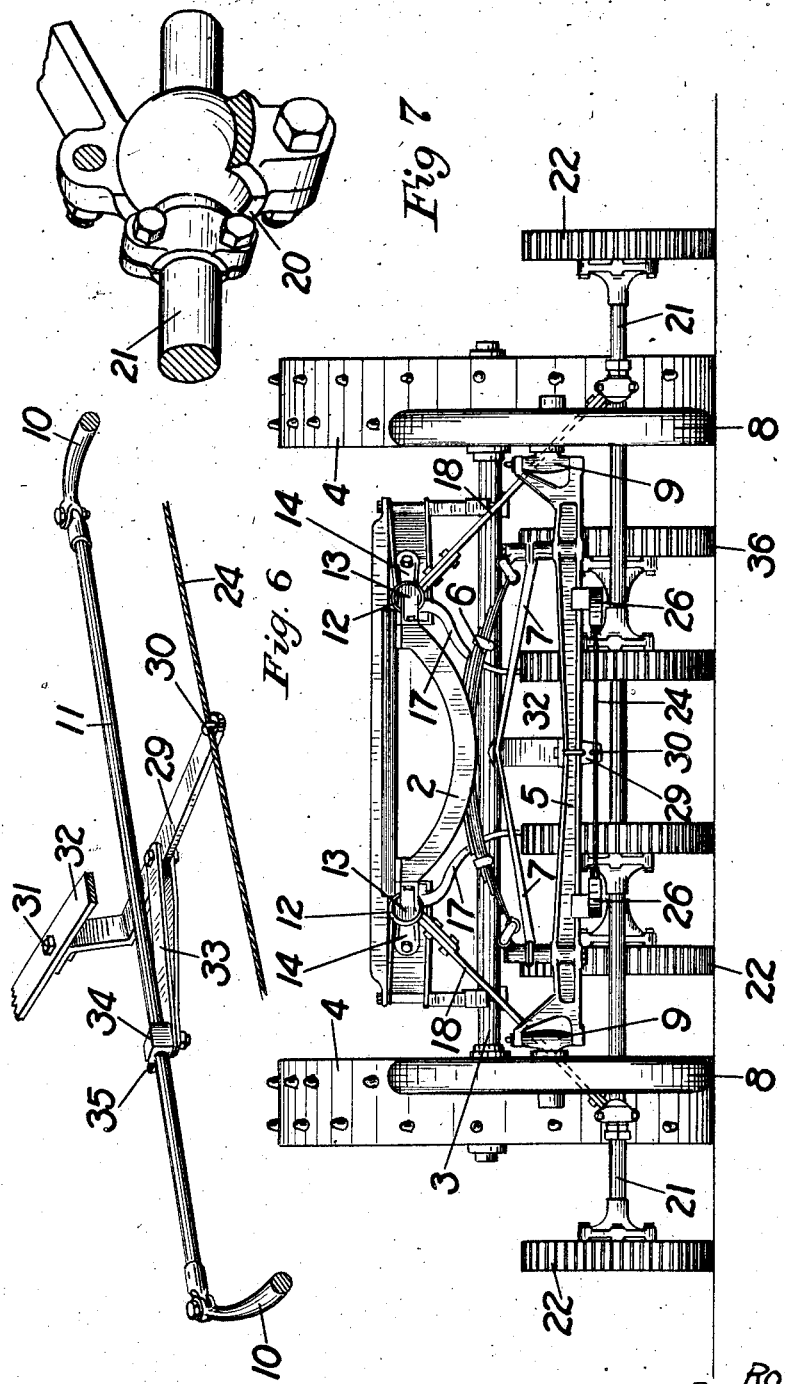

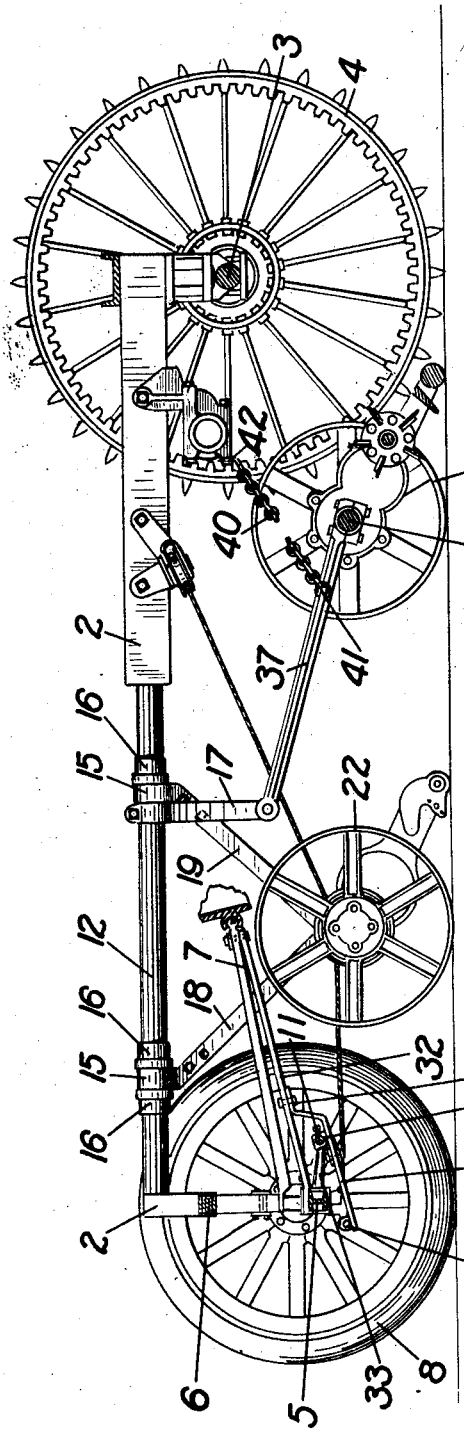
Sept. 3, 1929. R. A. FERGUSON 1,726,660
IMPLEMENT HITCH
Filed June 29, 1925  4 Sheets-Sheet 3
Inventor
ROY A. FERGUSON
By
Attorneys

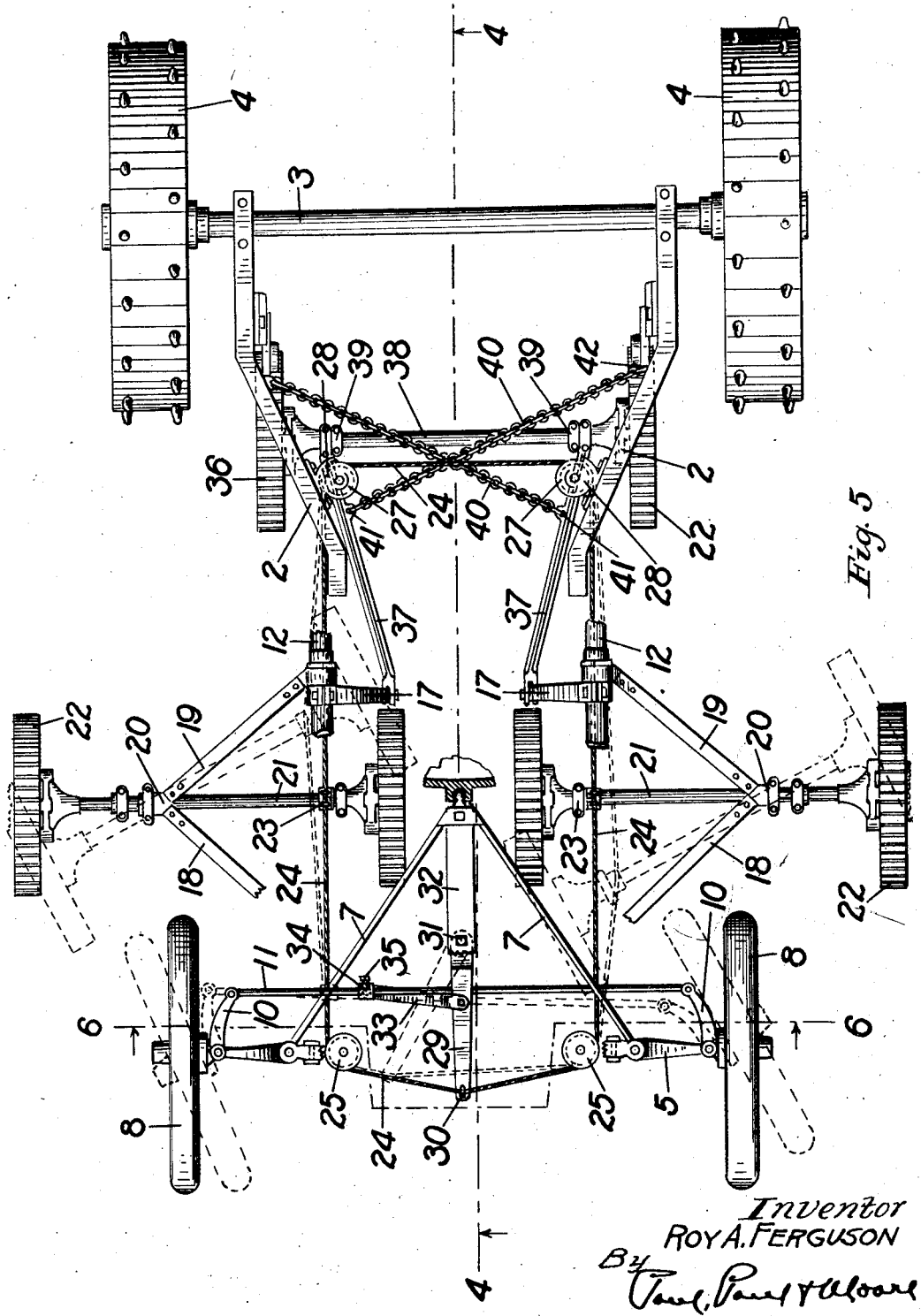

Patented Sept. 3, 1929.

1,726,660

UNITED STATES PATENT OFFICE.

ROY A. FERGUSON, OF MINNEAPOLIS, MINNESOTA.

IMPLEMENT HITCH.

Application filed June 29, 1925. Serial No. 40,277.

The invention relates to improvements in the means of attaching implements to tractors.

The primary object of this invention is to provide a tractor hitch for implements, such as the conventional mowers, rollers, harrows, drags, cultivators, etc., and particularly with reference to mowers; the hitch being so constructed that the implements may adapt themselves to the unevenness of the ground without regard to the position of the tractor.

A further object of this invention is to provide an implement hitch which will have a steering connection with the steering mechanism of the tractor so that as the front wheels of the tractor are turned, the two front implements or mowers will correspondingly turn in the same direction, and will travel freely over the ground and not be dragged sideways when a turn is made.

A further object of this invention is to provide a tractor hitch for mowers which will keep the mowers substantially in their normal position, regardless of whether the tractor is moving forward or backward.

A further object is to provide a tractor hitch for mowers which is compact and inexpensive to manufacture, and which will permit of a short turning radius and short tractor wheel base, and particularly adapted for cutting close into fence corners and around trees or other obstructions.

A further object is to provide a tractor hitch whereby the frame of the tractor will be utilized as a support for the cutting units.

A further object is to provide a tractor mower hitch which will readily permit backing up without causing the cutting units to double up under the tractor.

A further object is to provide a tractor hitch which will have a balanced steering connection with the tractor steering mechanism, so that the pull of one cutting unit if offset by the pull of the other cutting unit, thereby eliminating any undue strain on the steering mechanism.

Other objects of the invention will appear from the following detailed description.

The invention consists generally in various constructions and combinations, all as hereinafter described and particularly pointed out in the claims.

In the accompanying drawings forming part of this specification,

Figure 2 is a front view of Figure 1;

Figure 3 is an outside elevation of Figure 1;

Figure 4 is a section on the line 4—4 of Figure 5;

Figure 5 is a plan view similar to Figure 1 with some of the parts broken away, showing the position of the front cutting units and front tractor steering wheels in dotted lines when turning;

Figure 6 is a detail of the spindle connecting rod, showing the connection between the spindle and the cutting unit steering cable;

Figure 7 is a detail of the ball and socket joint for securing the cutting unit to the hitch.

Figure 1:
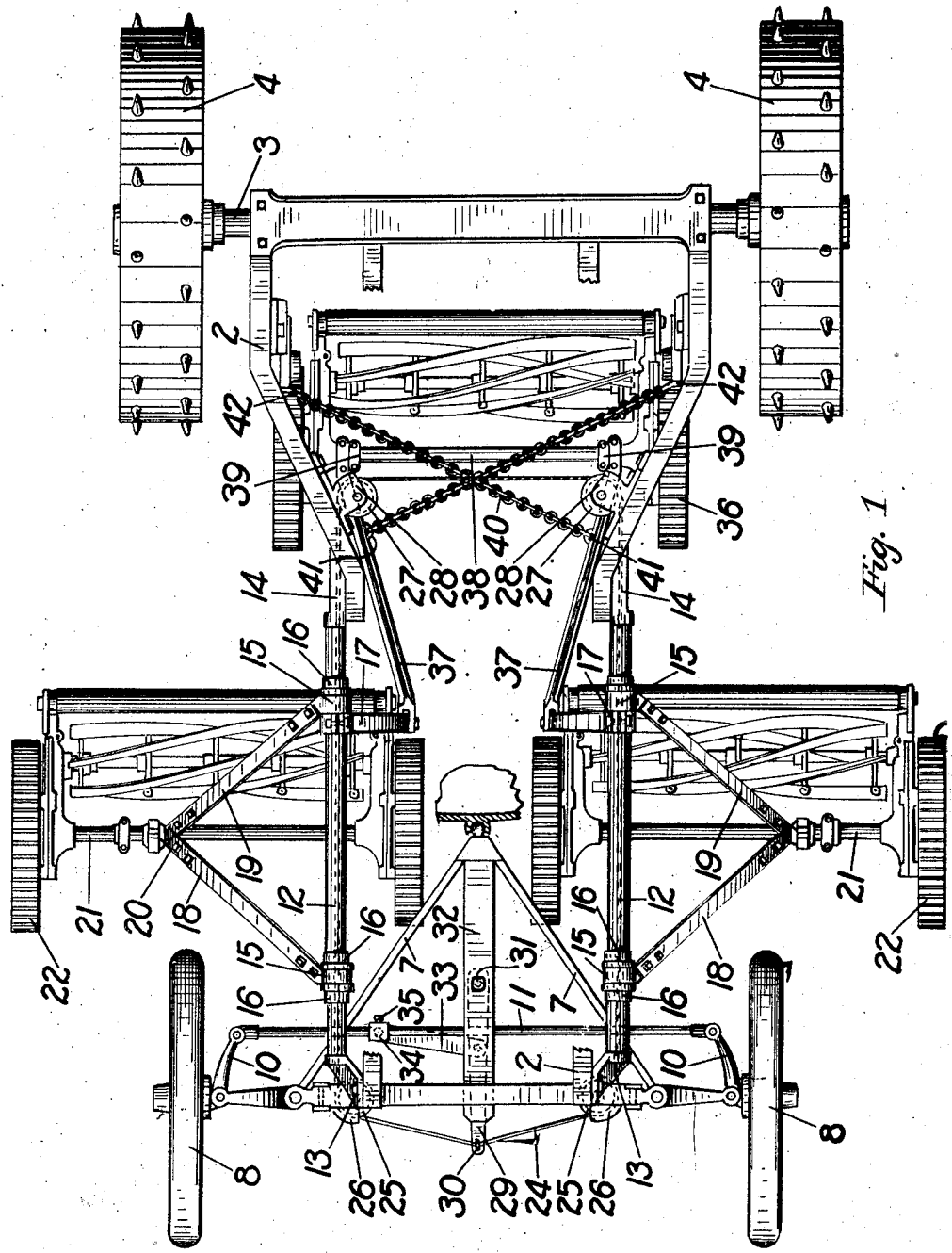
Figure 1 is a plan view of a tractor with the motor and body removed, showing my improved mower hitch applied to same.

As shown in the drawing, 2 represents a tractor frame of ordinary construction, the rear part of the frame being mounted on an axle 3 and supported by tractor wheels 4, and the front part of the frame 2 on an axle 5 by means of a spring 6 and the radius rod braces 7.

Suitable wheels 8 are mounted on the axle formed on the spindle 9 and secured to the axle 5 in the usual manner. The spindles 9 have the steering arms 10 connected by the spindle connecting rod 11.

On each side of the tractor frame 2, I provide a pipe 12, mounted at one end in the casting 13, secured to the frame 2, and at the other end in the casting 14, secured to the frame 2.

Each pipe 12 has a pair of loosely mounted castings 15 thereon held in place by suitable collars 16 and the drop arm 17.

The castings 15 have projections to which are bolted bars 18 and 19. The bars 18 and 19 converge toward the outer ends and are bolted to a ball and socket casting 20, the ball of which is secured to the cutting unit shaft 21 of the cutting unit 22.

As the tractor travels forward it is evident from the construction just described that the bars 18 and 19 are hinged on the pipe 12 and have a universal connection with the mowers 22. The connection of the ball for the ball and socket joint on the shaft of the mower 22 being near the outer end of the cutting unit, unless some provision is made to hold the cutting in position, it would tend to oscillate in various directions and not perform its work.

In order to insure the accurate position of the cutting unit with respect to the other cutting units and also with respect to the tractor, I provide a fixed collar 23 near the inner end of the mower axle and secure a cable 24 to this collar 23. The cable 24 passes around suitable pulleys 25 that are mounted in castings 26 and secured to the front axle 5.

The cable also passes around suitable pulleys 27 mounted in castings 28 and secured to the frame 2 of the tractor. At the forward end of the machine, the cable is secured at 30 to a bar 29 pivoted at 31 on a brace 32 that is secured to the radius rods 7 at the rear end and to the axle 5 at the forward end.

The bar 29 is connected to the spindle connecting rod 11 by a link 33 and block 34 secured to rod 11 by set screw 35.

The connection between the steering wheel of the tractor and the spindle connecting rod is not shown, but that is of the usual construction, so that when the steering wheel is operated it will move the spindle connecting rod and the wheels 8, and since the bar 29 is connected to the spindle connecting rod by the link 33, it follows that as the spindle connecting rod moves, it will carry with it the bar 29 and move the cable through its connection at the point 30 with the bar 29 in the same direction as the spindle connecting rod, except at proportionately greater speed.

As the cable 24 passes around the pulleys 25 and the pulleys 27 and is secured to the collar 23, which is mounted on the shaft of the cutting units, it follows that when the tractor steering wheels are in the position shown in full lines in Figure 5, the cutting units will have a like position, and when the spindle connecting rod is moved into the position shown in dotted lines, the front steering wheels will move into the position shown by dotted lines, and the two front cutting units will also take the position shown in dotted lines in Figure 5 and thereby greatly facilitate steering and prevent the sliding of the cutting units over the turf, causing them to pivot on the ball and socket joint 20 and adapting them to the uneven surface of the ground.

The rear cutting unit 36 is mounted somewhat ahead of the shaft 3, held in position by two bars 37, the rear end of the bars being pivotally secured to the cutting unit shaft 38. A suitable collar 39 is clamped in position to keep the bar 37 in place. The front ends of the bars 37 are pivotally secured to the drop arms 17.

In order that the rear cutting unit may also adapt itself for backing up and to prevent it from moving sideways, I provide a short piece of chain 40, secured to the bar 37 at the point 41 and to the frame 2 of the tractor at the point 42.

The cutting unit 36 being near the pivot point of the tractor, it is found unnecessary to mount this cutting unit so as to turn with the steering wheel of the tractor, because as the tractor turns, the side slippage of the cutting unit 36 is so small that it will readily adapt itself to the various positions without causing any excessive strain on the steering mechanism.

It will be noted that the cutting unit 36 is also free to adapt itself to the unevenness of the ground.

Alterations can be made in the detailed construction of the hitch just described without departing from the principle of the invention.

I claim as my invention:

1. A vehicle including front and rear axles connected by a frame and a steering connection including a steering reach-rod, a pair of mowers, one at each side of the frame, each including a shaft, a support for each mower, as a frame, attached at the upper end to swing vertically about a portion of the vehicle frame, laterally thereof, and having a universal one-point connection with the mower shaft at the lower end, and an endless cable guided upon the frame and having opposite runs respectively connected to corresponding mowers, said cable connected for movement by the steering reach-rod.

2. A vehicle and a bar secured to the frame thereof, a mower, a frame hinged to said bar for vertical movement and having a one-point universal connection with said mower, and means for controlling movement of the mower in a horizontal plane, said means connected laterally of the one-point universal connection.

3. A vehicle having a bar secured to one side thereof, a frame hinged thereon, an implement having a universal connection with said frame, and guiding means connected with the implement at a point laterally of the universal connection, and at the inner side.

4. A vehicle having a frame and drop arms thereon, an implement, and a pair of bars pivotally connecting it with said drop arm, and flexible means connecting each hinged bar with the opposite side of the vehicle frame and preventing sidewise sway of the implement but permitting it to adapt itself to an uneven surface of the ground.

5. A vehicle having a frame, implements upon opposite sides of the frame, means having a universal one-point connection with said implements, and connecting with said frame in front and in the rear of said implements, said means being hinged on said frame, and the axes of the implements being normally perpendicular to the line of draft, and a guided steering cable connected with each implement at the inner side of the universal one-point connection.

6. A vehicle comprising a frame, forward and rear axles therefor, a steering means, mowers connected with said frame between said forward and rear axles and mounted to oscillate horizontally, and a cable connected with said mowers and with said steering means whereby when said steering means is operated to oscillate the forward wheels and steer the machine, a corresponding movement will be imparted to said mowers.

7. A vehicle comprising a frame, forward steering wheels and rear traction wheels for said frame, an implement having a pivotal connection with said frame between said forward and rear wheels and mounted for oscillation on a vertical axis, a steering device connected with said forward wheels, and flexible means having a running connection with said frame and attached to said steering device and said implement for oscillating said implement and steering it simultaneously with the oscillation of said forward wheels.

8. A vehicle having a steering mechanism, a mower having a hinged and a one-point universal connection with the vehicle, and means connectng said mower at one side of the one-point connection with the steering mechanism, whereby movements of the steering mechanism will simultaneously change the position of the implement.

9. A vehicle having a steering mechanism, an implement having a hinged and a one-point universal connection with the vehicle, and flexible means having a running connection with the vehicle, and attached to the steering mechanism, and to said implement at one side of said one-point connection, for guiding said implement in correspondence to movements of the steering mechanism.

10. A vehicle having a steering mechanism for controlling the forward wheels, mowing implements, frames hinged to the tractor and each having a one-point universal connection with one of the implements, and flexible means connecting with said implements at one side of said one-point connection, and also connecting with the said steering mechanism, for moving said implements to guide them in correspondence with the movement of the forward wheels.

11. A vehicle including wheels, having a steering mechanism, wheeled implements each having a hinged and a one-point universal supporting connection with the vehicle, flexible means guided upon the vehicle and connecting the vehicle steering mechanism with said implements to keep the wheels of the implements in plane substantially parallel with the steered wheels of the vehicle, said flexible connections adapting the pull of one element to balance the pull of the other implement.

12. A vehicle including a frame, rear carrying wheels, forward steering wheels, and a steering mechanism for the steering wheels, mowers arranged between said forward and rear wheels, frames pivoted to said vehicle frame, extending laterally thereof, and each having a one-point universal connection with one of the mowers, and flexible means carried by the vehicle and connecting with each mower at points at one side of the one-point universal connections, and also with said steering mechanism, whereby when the steering wheels are moved a corresponding movement will be imparted to the mowers.

13. A vehicle including a frame, front steering wheels and rear supporting wheels, a cable guided upon the frame, a mower having an axle normally arranged in parallel relation with the front axle, and extending laterally beyond the wheels of the vehicle, means connecting the axle with the frame to permit universal movements of the axle, and means connecting another point of said axle to said cable, the connection with the cable being inwardly from the first mentioned connection, a steering connection, and means linking the steering connection for operation of the cable in correspondence to steering movements.

14. A vehicle including a frame, front steering wheels and rear supporting wheels, a cable guided upon the frame and providing runs extending lengthwise of the frame, mowers each having an axle normally arranged in parallel relation with the front axle, and extending laterally beyond the wheels of the vehicle, means separately connecting each axle with the frame to permit universal movements of the axle, and means separately connecting another point of each axle to one run of said cable, the connection with the cable being inwardly from the first mentioned connection and means connecting the steering wheels to operate the cable in correspondence to steering movements.

In witness whereof, I have hereunto set my hand this 25th day of June 1925.

ROY A. FERGUSON.